(12) United States Patent
Khoudari et al.

(10) Patent No.: US 6,578,867 B2
(45) Date of Patent: Jun. 17, 2003

(54) INFLATABLE SYSTEM FOR PROTECTION OF LOWER EXTREMITIES

(75) Inventors: Bassam Georges Khoudari, Shelby Township, MI (US); Chantal S. Parenteau, Troy, MI (US); Devadoss Katta, Troy, MI (US); Gregg G Anderson, Saint Clair Shores, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/877,385

(22) Filed: Jun. 8, 2001

(65) Prior Publication Data

US 2002/0185847 A1 Dec. 12, 2002

(51) Int. Cl.[7] .............................................. B60R 21/22
(52) U.S. Cl. ................................ 280/730.1; 280/743.1; 280/751
(58) Field of Search .......................... 280/770.1, 751, 280/743.1, 753

(56) References Cited

U.S. PATENT DOCUMENTS

| | | | | |
|---|---|---|---|---|
| 4,198,075 A | * | 4/1980 | Kob et al. ............... | 280/728.3 |
| 4,948,168 A | * | 8/1990 | Adomeit et al. ......... | 280/730.1 |
| 4,955,658 A | * | 9/1990 | Graves ...................... | 296/75 |
| 5,161,820 A | * | 11/1992 | Vollmer ..................... | 180/273 |
| 5,312,131 A | * | 5/1994 | Kitagawa et al. ........ | 280/728.1 |
| 5,324,070 A | * | 6/1994 | Kitagawa et al. ........ | 280/730.1 |
| 5,476,283 A | * | 12/1995 | Elton ........................ | 280/752 |
| 5,536,043 A | * | 7/1996 | Lang et al. ............... | 280/728.3 |
| 5,816,613 A | * | 10/1998 | Specht et al. ............. | 280/730.1 |
| 5,931,493 A | * | 8/1999 | Sutherland ................ | 280/730.1 |
| 6,032,978 A | | 3/2000 | Spencer et al. .......... | 280/730.1 |
| 6,158,766 A | * | 12/2000 | Kowalski .................. | 280/730.1 |
| 6,193,272 B1 | * | 2/2001 | Aigner et al. ............ | 280/730.1 |
| 6,203,057 B1 | | 3/2001 | Spencer et al. .......... | 280/730.1 |
| 6,213,497 B1 | * | 4/2001 | Spencer et al. .......... | 280/730.1 |
| 6,349,965 B1 | * | 2/2002 | Heilig ........................ | 280/748 |
| 6,371,511 B1 | * | 4/2002 | Kitagawa ................. | 280/730.1 |

* cited by examiner

*Primary Examiner*—Paul N. Dickson
*Assistant Examiner*—Toan C To
(74) *Attorney, Agent, or Firm*—Kathryn A. Marra

(57) ABSTRACT

An expansible enclosure adapted for storage across the flooring surface of a transportation vehicle beneath the foot of an occupant. The enclosure is expansible away from the underlying flooring surface and generally towards the foot of the occupant so as to engage the foot during a deceleration event thereby providing prolonged supporting contact to the foot during the deceleration event.

21 Claims, 4 Drawing Sheets

INFLATABLE SYSTEM FOR PROTECTION OF LOWER EXTREMITIES

TECHNICAL FIELD

This invention is related generally to inflatable vehicle protective devices and, more particularly, to an expansible bolster element disposed along the flooring surface of a vehicle and deployable upwardly towards the feet of the vehicle occupant upon the occurrence of an activating collision event.

BACKGROUND OF THE INVENTION

Inflatable bolsters have been developed to enhance vehicle occupant protection in the event of sudden vehicle deceleration. In particular, such devices have been developed in the form of knee bolsters to increase the duration of deceleration of occupants' femurs and to control upper torso kinematics during a frontal impact event. Representative knee bolster systems are illustrated and described in U.S. Pat. Nos. 6,213,497 and 6,203,057 to Spencer et al. the teachings of which are each incorporated by reference as is fully set forth herein. In such systems, the bolster impact surface is moved from a stored position to an extended position to intercept occupants' knees early in the impact event. This allows the knees more time to decelerate to the final velocity of the vehicle. The initial positioning of the bolster impact surface in a retracted stored position allows styling flexibility and enhances leg room prior to deployment.

While deployable knee bolsters are believed to provide substantial protection to the knees and femur of a vehicle occupant, such systems do not substantially address energy transfer between the occupants' feet and the underlying vehicle flooring. Impact studies have recently shown that during a sudden deceleration interaction between an occupant's feet and the flooring surface of the vehicle may lead to injury. Such injury may be particularly likely to occur during the act of braking as the operator of the vehicle attempts to respond in a rapid manner to a perceived impending collision event. The possibility of injury may be enhanced as the foot pivots during interaction with the braking pedal. Furthermore, if the foot is not centered in the middle of the brake pedal, the possibility exists that the foot may turn to one side thereby further promoting the potential for injury. Of course, in the case of a vehicle incorporating a manual transmission, such issues are also encountered with respect to operation of the clutch pedal. Moreover, non-operating vehicle passengers may be subjected to similar types of energy transfer which may lead to injury during a deceleration event such as when the foot is not positioned squarely on the flooring surface.

Common injuries seen in the lower extremities of occupants following collision events include heel injuries, ankle injuries, and injuries to the lower tibia. Such injuries are generally the result of contact between the heel and the toe pan region of the flooring surface. The use of static padding elements to support the foot under the heel area has been contemplated. However, due to the limited space availability below the operating pedals, padding of sufficient thickness to provide substantial benefit may be difficult to incorporate. Moreover, if padding of excessive thickness is used, the feet may be forced into localized compressed pockets surrounded by a raised surface of uncompressed padding. Such localized indentation may be undesirable in the event of a secondary impact such as a side collision due to the fact that the feet are unduly constrained.

SUMMARY OF THE INVENTION

This invention provides advantages and alternatives over the prior art by providing a highly efficient energy absorption device to support the foot and heel during a rapid deceleration event. The device also aids in preventing an operator's foot from slipping off the brake and/or clutch pedals if contact between the foot and the pedal is off center when in the braking mode. In addition, the device incorporates a shallow profile configuration which occupies only a minor degree of space beneath the feet of the occupant and which may be hidden in a substantially undetectable manner beneath the carpeting on the vehicle floor.

These advantages are accomplished in a potentially preferred form of the invention by providing a hollow expansible enclosure adapted for storage at the intersection of the toepan and floorpan regions of the vehicle floor. The hollow enclosure is expansible away from the underlying flooring support surface and generally towards the foot of the occupant to be protected so as to engage the foot at an early stage of the deceleration event and to thereafter provide prolonged supporting contact between the hollow enclosure and the foot. The hollow enclosure is preferably formed of a substantially rigid material such as plastic, polycarbonate, or the like so as to provide a substantially non-cavity forming expanded surface for interaction with the foot of the occupant to be protected.

Preferably, the hollow enclosure is of a generally profiled geometry so as to mate with the contour of the interface between the toepan and the floorpan regions of the underlying flooring support surface. The expanded depth dimension of the hollow enclosure may be either uniform throughout the structure or may be enhanced in a region substantially in opposing relation to the heel of the occupant to be protected so as to provide added energy absorption at that location. The hollow enclosure may also have an enhanced expanded profile extending in a direction laterally of the foot of the occupant to be protected so as to offset the effects of lateral flexion in the event that the foot is misplaced or slips off of the pedal during the deceleration event.

Preferably, expansion of the hollow enclosure is carried out by the collapsible deformation of accordion style rib elements normally extending in raised and lowered relief away from the underside of the enclosure and towards the face portion thereby causing the face to be projected towards the foot of the occupant to be protected. The materials forming the underside and the face portion may be either similar or dissimilar in character. If desired, the hollow enclosure may be formed as a single piece construction by means of highly efficient injection or blow molding techniques.

BRIEF DESCRIPTION OF THE DRAWINGS

A full enabling disclosure of the present invention is set forth more particularly in the remainder of the specification, including reference to the accompanying figures in which.

While the invention has been illustrated and generally described above and will hereinafter be described in connection with certain potentially preferred embodiments, constructions and practices, it is to be understood that in no event is the invention to be limited to such illustrated and described embodiments, constructions or practices. On the contrary, it is intended that the present invention shall extend to all alternatives and modifications as may embrace the broad principles of this invention within the true spirit and scope thereof.

DESCRIPTION OF THE PREFERRED EMBODIMENT

Figure 1:
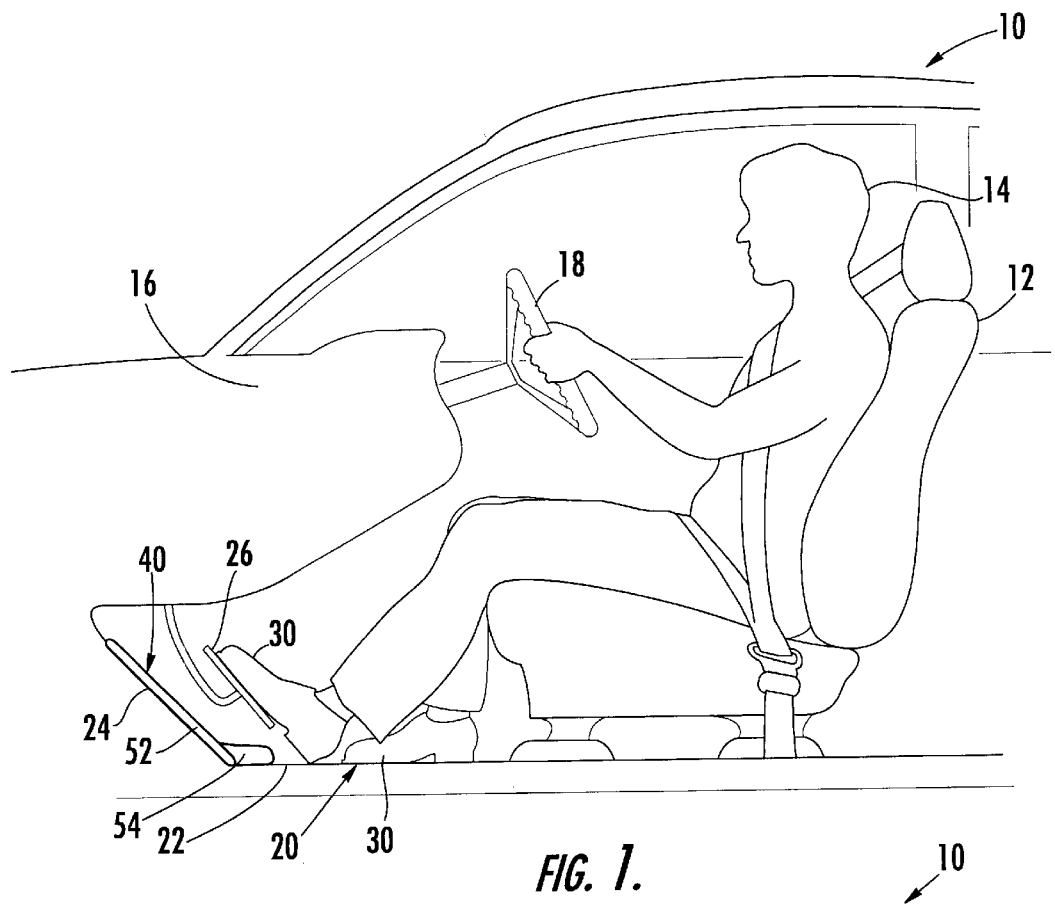
FIG. 1 is a cut-away side view of a vehicle interior illustrating a lower extremity energy absorption device in a stored position prior to activation.

Turning now to the drawings, wherein like reference numerals have been utilized to designate like components throughout the various view, in FIG. 1 there is illustrated the interior of a vehicle 10 such as a automobile as will be well known to those of skill in the art. As illustrated, the vehicle 10 includes a front seat 12 which may be used to support a front seated vehicle occupant 14. The vehicle 10 may further include one or more rear seats which may be used to support additional occupants (not shown). While the front seat 12 is illustrated as being located on the driver's side of the vehicle 10, it is to be appreciated that the present invention is also useful in the protection of an occupant (not shown) seated on the passenger side of the vehicle 10.

As shown, the vehicle 10 includes an instrument panel 16 disposed in substantially opposing relation to the occupant 14. A steering wheel 18 extends generally away from the instrument panel 16 for manipulation by the occupant 14. The vehicle 10 includes a flooring support surface 20. As will be appreciated by those of skill in the art, the flooring support surface 20 typically includes a floorpan portion 22 extending to a position in front of the front seat 12 to an angled transition zone. The flooring support surface 20 typically further includes a toepan portion 24 angled upwardly away from the floorpan portion 22 towards the underside of the instrument panel 16. On the driver's side of the vehicle 10, the toepan portion 24 is disposed generally behind a plurality of operating pedals 26 for manipulation by the occupant 14 using his or her feet 30. As will be appreciated, in the event that the vehicle 10 incorporates an automatic transmission, the operating pedals 26 typically include an accelerator pedal and a brake pedal while in a manual transmission vehicle 10, a clutch pedal will also be present. As will be further appreciated, the configuration of the flooring support surface 20 is typically substantially duplicated on the passenger side of the vehicle but with the omission of the operating pedals 26.

Figure 2:
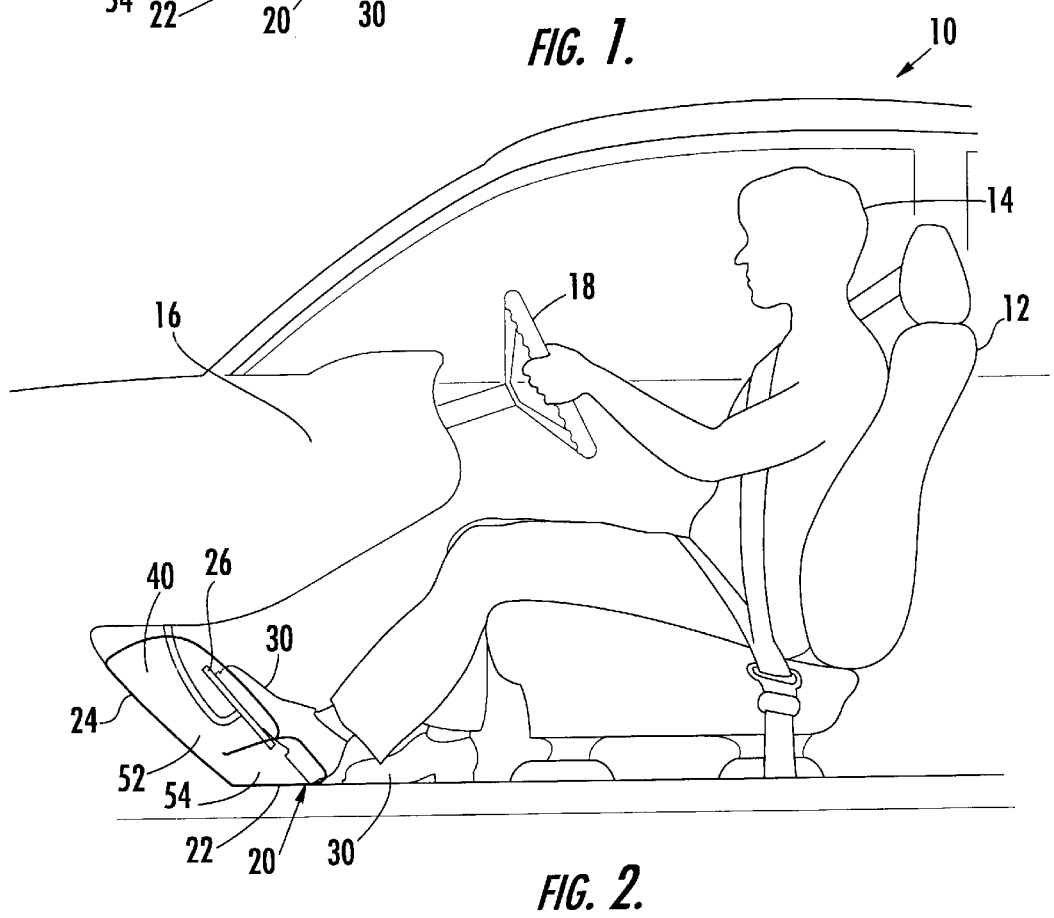
FIG. 2 is a view similar to FIG. 1 following expansion of the energy absorption device.
Figure 3:
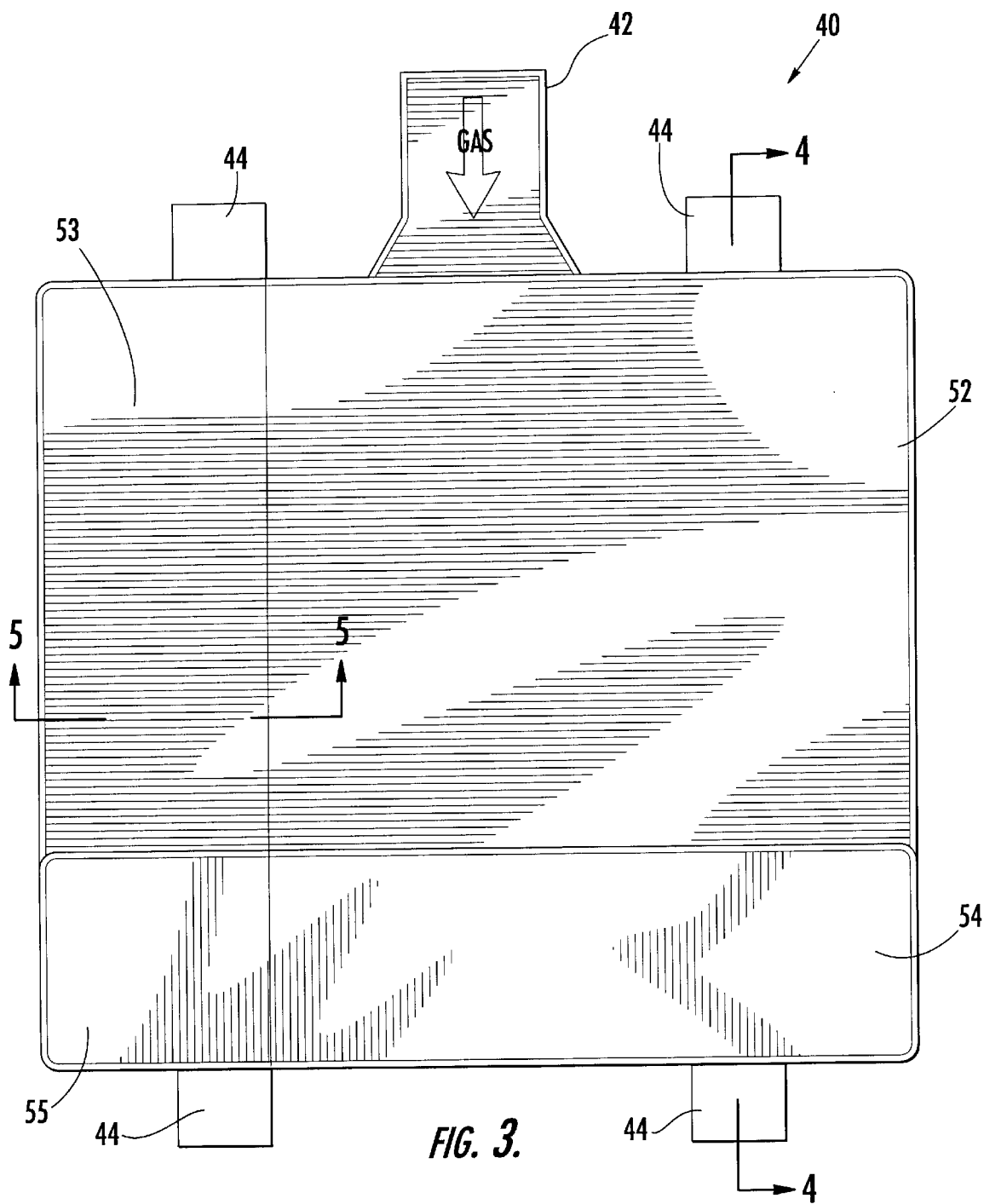
FIG. 3 is a plan view of one embodiment of the energy absorption device as shown in FIGS. 1 and 2.

According to the embodiment of the present invention as illustrated in FIGS. 1–3, an expansible element 40 of relatively thin profile is disposed across a portion of the flooring support surface 20 generally at the intersection between the floorpan portion 22 and the toepan portion 24 beneath the operating pedals 26. The expansible element 40 preferably occupies a similar position on the passenger side of the vehicle 10.

Figure 4:
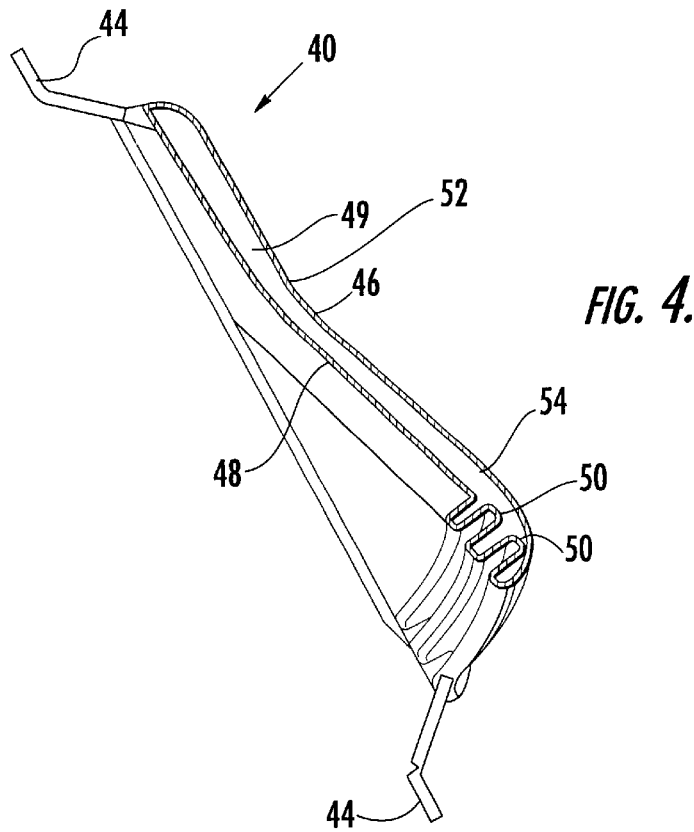
FIG. 4 is a view taken generally along line 4—4 in FIG. 3.

As best illustrated in FIG. 3, the expansible element 40 is preferably of a generally shallow panel-like configuration including a gas inlet opening 42 for introduction of an inflating medium into the expansible element 40. The expansible element 40 may be secured in place to the flooring support surface 20 by an arrangement of attachment tabs 44 as shown. As illustrated in FIG. 4, the expansible element 40 preferably includes a face portion 46 arranged facing generally towards the feet 30 of the occupant 14 and an underside 48 generally opposing the flooring support surface 20. The face portion 46 and the underside 48 define the upper and lower boundary surfaces of an expansible chamber 49.

According to the potentially preferred practice, the underside 48 is molded to incorporate a plurality of deformable profile elements 50 in the form of collapsible pleats projecting from the underside 48 towards the face 46 across the expansible chamber 49 between the face portion 46 and the underside 48. The profile elements 50 are preferable arranged in a concentrated pattern at locations where expansion of the expansible element 40 is to be promoted. In particular, it is contemplated that the expansible element 40 preferably includes a plurality of profile elements 50 in the region adjacent the lower edge of the expansible element 40 in opposing relation to the heel of the occupant 14. As best illustrated in FIG. 2, this configuration gives rise to enhanced expansion of the expansible element 40 towards the heel upon introduction of inflation gas through the gas inlet opening 42.

Figure 5:
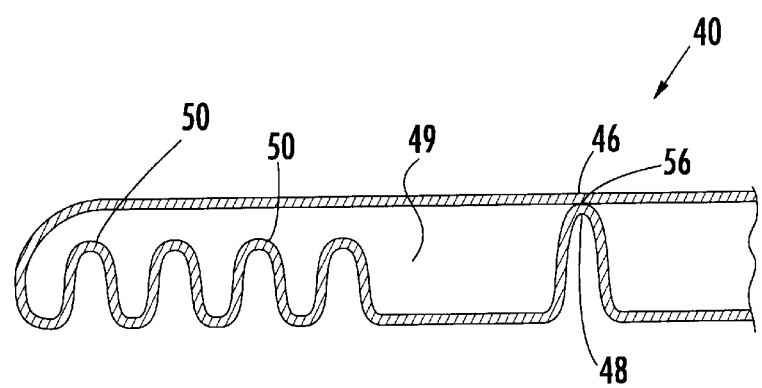
FIG. 5 is a view taken generally along line 5—5 in FIG. 3.

As illustrated in FIG. 5, one or more profile elements 50 may also be arranged in a pattern so as to extend in a generally lateral direction (i.e. substantially parallel) to the normal position of the feet 30 of the occupant 14. Such an arrangement of profile elements 50 in a generally lateral direction is believed to provide a stabilizing surface peripheral to the pedals 26 thereby aiding in the prevention of lateral flexure of the feet 30 in the event that the feet 30 are out of position or slip off of the pedals 26. According to the illustrated embodiment, the profile elements arranged laterally of the pedals 26 are disposed generally outboard of the normal position of the feet 30. However, it is likewise contemplated that such profile elements may also be disposed at positions generally inboard of the normal position of the feet 30 if desired.

In operation, upon the occurrence of an initiating event such as deceleration exceeding a certain level, an inflating gas is released from an inflator (not shown) for introduction into the expansible chamber 49 between the face portion 46 and the underside 48. As inflation gas enters the expansible chamber 49, an enhanced internal pressure is established. This pressure buildup causes the profile elements 50 to undergo at least a partial collapse towards the flooring support surface 20. This collapse in turn causes the face portion 46 to be thrust upwardly away from the flooring support surface 20 and towards the opposing feet 30 of the occupant 14 so as to result in the desired interaction. The expansible element 40 may thereafter undergo a force dissipating collapse as the deceleration event proceeds to conclusion. As will be appreciated, by controlled patterning of the profile elements 50 at predetermined locations across the expansible element 40, substantial inflation may be achieved at desired locations without interfering with the ability to fully depress the pedals 26 needed for operation. Accordingly, in the zone directly beneath the pedals 26, little if any expansion may take place while substantial inflation may take place in the regions below and to the side of the pedals 26 as may be desired.

It is contemplated that the expansible element 40 may be formed from a single material as a unitary structure using injection-molding or blow molding practices. It is also contemplated that the face 46 and underside may be formed of separate materials and thereafter jointed together by means such as welding, mechanical clamping or the like. In such a configuration, it is contemplated that the face portion 46 may be of a more rigid material than the material forming the underside 48 thereby promoting preferential deformation of profile elements 50. Such differential rigidity may be achieved by adjusting the thickness of the face portion 46 relative to the underside 48 or by using polymers of different durometer for the face portion 46 and the underside 48. Potentially preferred materials for forming the face portion 46 and the underside 48 are thermoplastic moldable polymers including by way of example only, polypropylene, polycarbonates, polyurethanes, and combinations thereof.

It is believed that injection molding of expansible element 40 may permit the achievement of extremely close tolerances which may be desirable in some applications. However, other molding techniques as may be known to those of skill in the art including by way of example only, compression molding, extrusion, blow molding, and the like may also be utilized if desired.

Figure 5A:
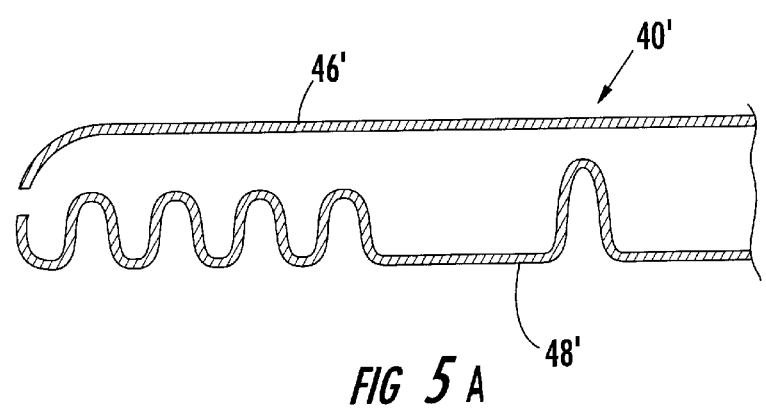
FIG. 5A is a view similar to FIG. 5 illustrating an expansible element of multi-piece construction with the face separated from the underside.

As previously indicated, the expansible element may be formed as separate components which are thereafter joined together in a desired configuration. By way of example, it is contemplated that the face may be formed separately from the underside and thereafter joined to the underside. The separate components of such a multi-piece construction are illustrated in spaced apart aligned relation in FIG. 5A in which the expansible element 40' is formed from a face portion 46' which may be welded or otherwise secured in place over a separately formed underside portion 48'.

As indicated, it is contemplated that the materials forming the face portion 46 and the underside 48 may be either of similar or dissimilar chemical composition. According to one embodiment, the face portion 46 is formed from an injection molded polycarbonate thermoplast of high rigidity and impact strength while the underside 48 is formed from a flexible injection molded polyurethane rubber. The use of materials of such different rigidity tends to facilitate the preferential deformation of the profile elements 50 across the underside 48 while simultaneously permitting the face portion 46 to resist substantial surface deformation and thereby provide a substantially uniform contact surface for the feet 30 of the occupant 14.

According to the embodiment illustrated in FIGS. 1–5, the expansible element 40 is of a profiled cross-sectional geometry so as to conform to the contour of the flooring support surface 20. As illustrated in FIG. 1, this configuration gives rise to a toe impact portion 52 and to a heel impact portion 54 in raised relation to the toe impact portion 52 immediately opposing the heel of the occupant 14. As best illustrated in FIG. 4, this profile orientation may be enhanced by the configuration of the attachment tabs 44 which may be used to maintain the lower portion of the expansible element 40 in a slightly raised condition relative to the heel prior to expansion so as to provide early interaction with the heel of the occupant 14 upon activation. Moreover, such attachment tabs 44 may be of a deformable character such that upon engagement between the expansible element 40 and the feet of the occupant 14, the tabs 44 may themselves undergo either elastic or plastic deformation so as to provide further energy dissipation.

While the expansible element 40 is illustrated as having fluid communication throughout its interior, it is likewise contemplated that the expansible element 40 may be subdivided into two or more substantially discrete chambers each of which are independently inflatable if desired. Such independent expansion may provide further control over the final expanded profile if desired.

As indicated, it is contemplated that the final expanded profile of the expansible element 40 may be controlled to a substantial degree by the location and number of profile elements 50 extending towards the face portion 46. In general, it is believed that the larger the surface area of the profile elements in a given region, the greater the outer projection will be for the face portion 46 opposing those profile elements 50. It is contemplated that further control over the expansible characteristics may be achieved by limiting the degree of separation between the face portion 46 and the underside 48 in locations where inflation is not desired. By way of example only, and not limitation, it is contemplated expansion may be limited in predefined locations by the establishment of fixed connections between the interior surfaces of the face portion 46 and underside 48. Such fixed connections may be established by an arrangement of weld points 56 arranged in a predefined desired pattern across the expansible element 40 thereby establishing substantially zero length tethers between the face portion 46 and the underside 48. By way of example only, it is contemplated that such limitation on expansion may be introduced in regions of the expansible element 40 immediately below the pedals 26.

Figure 6:
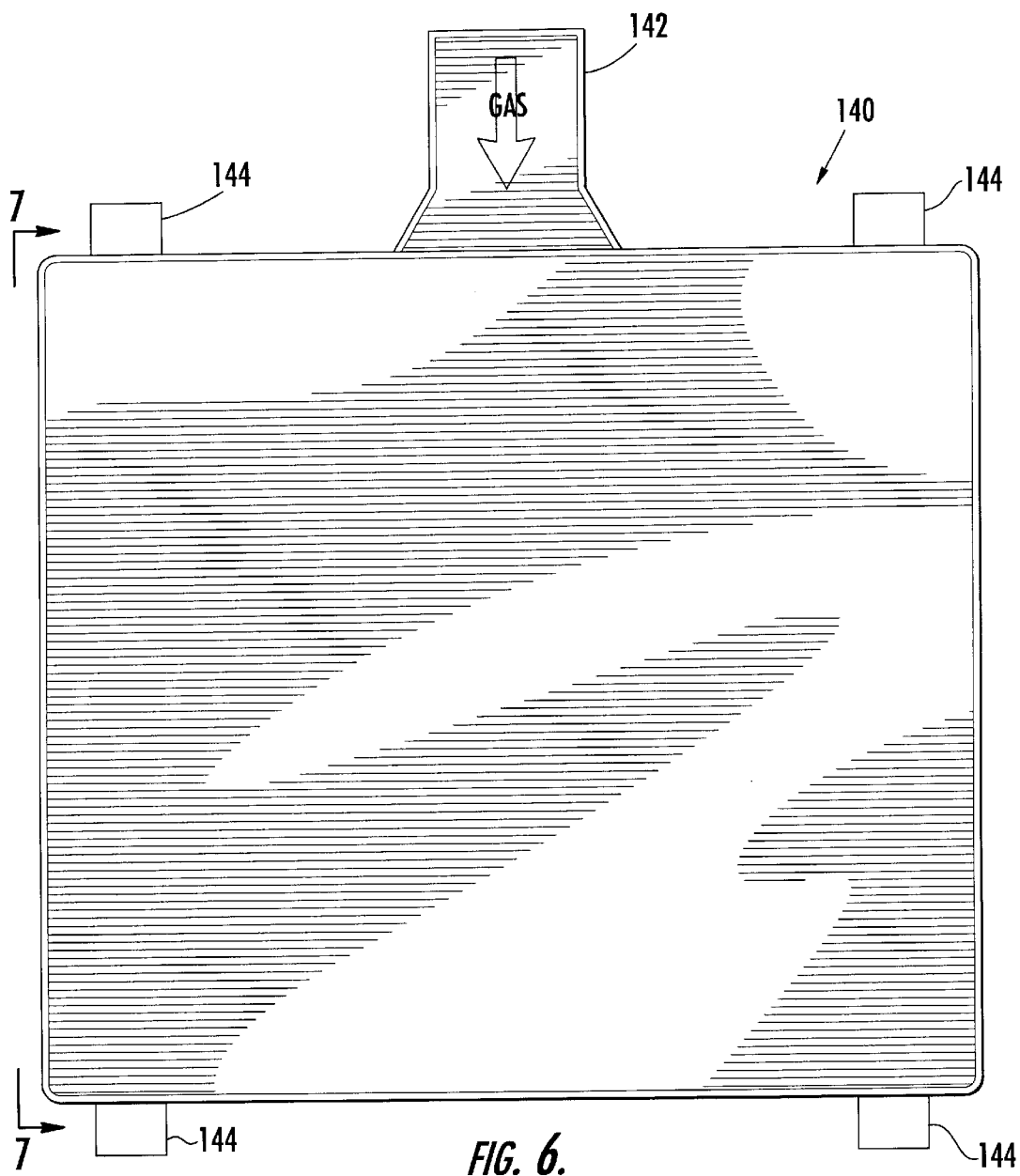
FIG. 6 is a plan view of an alternative embodiment of the energy absorption device according to the present invention incorporating a substantially non-profiled configuration.
Figure 7:
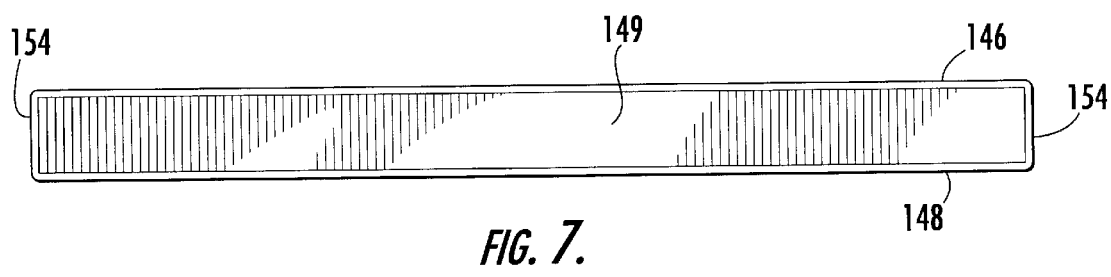
FIG. 7 is a view taken generally along line 7—7 in FIG. 6 illustrating the substantially flat profile configuration.

While the present invention may incorporate a generally profiled configuration promoting enhanced expansion beneath the heel of the occupant 14 in a manner as previously illustrated and described, it is likewise contemplated that a substantially flat panel configuration may also be utilized to provide a number of benefits. Such a configuration is illustrated in FIG. 6 wherein elements previously described are denoted by like reference numerals increased by 100. As illustrated, in this embodiment, the expansible element 140 is substantially planar in configuration thereby establishing a substantially flat panel bounded by a face portion 146 and underside 148 (FIG. 7). In such a configuration, expansion takes place by simple outward expansion between the face 146 and the underside 148. Such a configuration may be particularly suitable for use in opposing relation to a front or rear seated non-operating passenger whose feet are typically not in well defined positions. As with previously described embodiments, energy may be further dissipated by deformation of the attachment tabs 144 if desired.

Regardless of the embodiment utilized, it is believed that the present invention provides a useful energy dissipation device which may be stored prior to activation along the flooring support surface 20 of a vehicle 10 in an unobtrusive manner below the carpeting or other material overlying the flooring support surface 20. The present invention is thus believed to provide a useful advancement over the state of the art. It is to be understood that while the present invention has been illustrated and described in relation to certain potentially preferred embodiments, constructions and procedures, that such embodiments, constructions and procedures are intended to be illustrative only and that the present invention is in no event to be limited thereto. Rather it is contemplated that modifications and variations embodying the principles of this invention will no doubt occur to those of skill in the art. It is thus contemplated and intended that the present invention shall extend to all such modifications and variations as may incorporate the broad aspects of the invention within the full spirit and scope of the appended claims and all equivalents thereto.

What is claimed is:

1. An apparatus for protection of the foot, heel and lower leg of an occupant within a transportation vehicle including a flooring support surface, the apparatus comprising:

an expansible element of substantially hollow construction configured for disposition across at least a portion of the flooring support surface at a location substantially below and in front of the occupant, the expansible element including a face portion facing outwardly away from the flooring support surface, an underside disposed in opposing relation to the face portion between the face portion and the flooring support surface, and an inflation gas inlet for introduction of inflating gas upon the occurrence of a collision event, the expansible element being of a deformable box construction of plastically deformable material such that upon introduction of the inflating gas, the face portion is projected outwardly in the direction away from the flooring support surface and into contact with the feet of the occupant whereby energy is transmitted between the feet of the occupant and the expansible element.

2. The apparatus as recited in claim 1, wherein said expansible element is of one-piece construction.

3. The apparatus as recited in claim 1, wherein said expansible element is of multi-piece construction.

4. The apparatus as recited in claim 3, wherein the face portion and the underside are formed of different materials.

5. The apparatus as recited in claim 4, wherein the face portion is formed of a material of greater rigidity than the material forming the underside.

6. The apparatus as recited in claim 1, wherein the face portion and the underside are attached together at predefined locations spaced away from edge portions of the expansible element such that the face portion is restricted against outward projection away from the underside at said predefined locations.

7. An apparatus for protection of the foot, heel and lower leg of an occupant within a transportation vehicle including a flooring support surface, the apparatus comprising:

an expansible element of substantially hollow construction configured for disposition across at least a portion of the flooring support surface at a location substantially below and in front of the occupant, the expansible element including a face portion facing outwardly away from the flooring support surface, an underside disposed in opposing relation to the face portion between the face portion and the flooring support surface, and an inflation gas inlet for introduction of inflating gas upon the occurrence of a collision event, the underside comprising a plurality of at least partially collapsible profile elements extending towards the face portion, such that upon introduction of the inflating gas, at least a portion of the profile elements undergo at least partial collapse away from the face portion whereby the face portion is projected outwardly in the direction away from the flooring support surface and into contact with the feet of the occupant whereby energy is transmitted between the feet of the occupant and the expansible element.

8. The apparatus as recited in claim 7, wherein said expansible element is of one-piece construction.

9. The apparatus as recited in claim 7, wherein said expansible element is of multi-piece construction.

10. The apparatus as recited in claim 9, wherein the face portion and the underside are formed of different materials.

11. The apparatus as recited in claim 10, wherein the face portion is formed of a material of greater rigidity than the material forming the underside.

12. The apparatus as recited in claim 7, wherein the face portion and the underside are attached together at predefined locations, whereby the face portion is restricted against outward projection at said predefined locations.

13. An apparatus for protection of the foot, heel and lower leg of an occupant within a transportation vehicle including a flooring support surface having a toepan portion and a floorpan portion, the apparatus comprising:

an expansible element of substantially hollow construction configured for disposition across at least a portion of the flooring support surface at a location substantially below and in front of the occupant, the expansible element including a face portion facing outwardly away from the flooring support surface, an underside disposed in opposing relation to the face portion between the face portion and the flooring support surface, and an inflation gas inlet for introduction of inflating gas upon the occurrence of a collision event, the expansible element including a toe impact portion for disposition in covering relation to the toepan portion of the flooring support surface and a heel impact portion disposed at a location below the toe impact portion, the expansible element being of a deformable construction such that upon introduction of the inflating gas, the heel impact portion is projected towards the feet of the occupant whereby energy is transmitted between the feet of the occupant and the heel impact portion, the heel impact portion being expansible to an enhanced depth dimension relative to at least a portion of the toe impact portion, wherein the face portion and the underside are attached together at predefined locations spaced away from edge portions of the expansible element such that the face portion is restricted against outward projection away from the underside at said predefined locations.

14. The apparatus as recited in claim 13, wherein said expansible element is of one-piece construction.

15. The apparatus as recited in claim 13, wherein said expansible element is of multi-piece construction.

16. The apparatus as recited in claim 15, wherein the face portion and the underside are formed of different materials.

17. The apparatus as recited in claim 16, wherein the face portion is formed of a material of greater rigidity than the material forming the underside.

18. An apparatus for protection of the foot, heel and lower leg of an occupant within a transportation vehicle including a flooring support surface having a toepan portion and a floorpan portion, the apparatus comprising:

an expansible element of substantially hollow construction configured for disposition across at least a portion of the flooring support surface at a location substantially below and in front of the occupant, the expansible element including a face portion facing outwardly away from the flooring support surface, an underside disposed in opposing relation to the face portion between the face portion and the flooring support surface, and an inflation gas inlet for introduction of inflating gas upon the occurrence of a collision event, the expansible element including a toe impact portion for disposition in covering relation to the toepan portion of the flooring support surface and a heel impact portion disposed at a location below the toe impact portion, the heel impact portion comprising a plurality of at least partially collapsible profile elements, such that upon introduction of the inflating gas, at least a portion of the profile elements undergo at least partial collapse whereby the face portion of the heel impact portion is projected outwardly in the direction away from the flooring support surface and into contact with the feet of the occupant, the heel impact portion being expansible to an enhanced depth dimension relative to at least a portion of the toe impact portion.

19. An apparatus for protection of the foot, heel and lower leg of an occupant within a transportation vehicle including a flooring support surface having a toepan portion and a floorpan portion, the apparatus comprising:

an expansible element of substantially hollow construction configured for disposition across at least a portion of the flooring support surface at a location substantially below and in front of the occupant, the expansible element including a face portion facing outwardly away from the flooring support surface, an underside disposed in opposing relation to the face portion between the face portion and the flooring support surface, and an inflation gas inlet for introduction of inflating gas upon the occurrence of a collision event, the expansible element including a toe impact portion for disposition in covering relation to the toepan portion of the flooring support surface and a heel impact portion disposed at a location below the toe impact portion, the heel impact portion and the toe impact portion each comprising a plurality of at least partially collapsible profile elements, such that upon introduction of the inflating gas, at least a portion of the profile elements undergo at least partial collapse whereby the face portion of the heel impact portion and the face portion of the toe impact portion are projected outwardly in the direction away from the flooring support surface and into contact with the feet of the occupant.

20. The apparatus as recited in claim 19, wherein the heel impact portion is expansible to an enhanced depth dimension relative to at least a portion of the toe impact portion.

21. The apparatus as recited in claim 19, wherein the face portion and the underside are attached together at predefined locations spaced away from edge portions of the expansible element such that the face portion is restricted against outward projection away from the underside at said predefined locations.

* * * * *